US012806533B2

(12) United States Patent
Szostak et al.

(10) Patent No.: US 12,806,533 B2
(45) Date of Patent: Nov. 24, 2026

(54) SYSTEM AND METHOD FOR DETERMINING A SKILL FACTOR OF A CLIENT APPLICATION

(71) Applicant: Skillz Platform Inc., Las Vegas, NV (US)

(72) Inventors: Igor Szostak, San Francisco, CA (US); Lillian Tong, San Francisco, CA (US); Scott L. Gregoire, Portland, OR (US); Kevin Babb, Oakland, CA (US)

(73) Assignee: Skillz Platform, Inc., Las Vegas, NV (US)

( * ) Notice: Subject to any disclaimer, the term of this patent is extended or adjusted under 35 U.S.C. 154(b) by 171 days.

(21) Appl. No.: 18/745,897

(22) Filed: Jun. 17, 2024

(65) Prior Publication Data

US 2024/0416244 A1 Dec. 19, 2024

Related U.S. Application Data

(60) Provisional application No. 63/508,332, filed on Jun. 15, 2023.

(51) Int. Cl.

| | |
|---|---|
| ***A63F 13/798*** | (2014.01) |
| ***A63F 13/46*** | (2014.01) |
| ***A63F 13/67*** | (2014.01) |
| ***A63F 13/79*** | (2014.01) |
| ***A63F 13/822*** | (2014.01) |

(52) U.S. Cl.
CPC ............ *A63F 13/798* (2014.09); *A63F 13/46* (2014.09); *A63F 13/67* (2014.09); *A63F 13/79* (2014.09); *A63F 13/822* (2014.09); *A63F 2300/558* (2013.01); *A63F 2300/61* (2013.01)

(58) Field of Classification Search
CPC ........ A63F 13/67; A63F 13/46; A63F 13/798; A63F 13/79; A63F 13/822; A63F 2300/61; A63F 2300/558
See application file for complete search history.

(56) References Cited

U.S. PATENT DOCUMENTS 8,882,576 B1 * 11/2014 Paradise ................. A63F 13/35
463/16
9,479,602 B1 * 10/2016 Paradise ................. A63F 13/86
(Continued)

FOREIGN PATENT DOCUMENTS

WO 2024259287 A2 12/2024

*Primary Examiner* — William H Mcculloch, Jr.
(74) *Attorney, Agent, or Firm* — Mintz Levin Cohn Ferris Glovsky and Popeo P.C.

(57) ABSTRACT

Methods, systems, and an apparatus, including computer programs encoded on a computer storage medium, are provided for determining a skill factor of a client application. The method can comprise performing a statistical analysis of a plurality of users who interacted with a client application for generating a first set of users and a second set of users, determining, outcomes of a number of random matchups between users selected from the first set of users and users selected from the second set of users to generate a score indicating how often the users selected from the first set of users defeat the users selected from the second set of users, modifying the client application when the score that is generated is greater than or equal to a skill score, and providing the client application that is modified to the plurality of users on respective client devices.

20 Claims, 4 Drawing Sheets

100

(56) References Cited

U.S. PATENT DOCUMENTS

| | | | | | |
|---|---|---|---|---|---|
| 11,571,630 | B2 * | 2/2023 | Paradise | ................. | H04L 67/12 |
| 11,819,764 | B2 * | 11/2023 | Benedetto | ........... | A63F 13/5375 |
| 11,890,545 | B2 * | 2/2024 | Zaghetto | ................. | A63F 13/67 |
| 11,992,774 | B2 * | 5/2024 | Paradise | ............... | G06F 16/953 |
| 12,168,182 | B2 * | 12/2024 | Pierse | ................... | A63F 13/822 |
| 12,343,641 | B2 * | 7/2025 | Paradise | ............... | H04L 67/131 |
| 12,533,592 | B2 * | 1/2026 | Benedetto | ............... | A63F 13/67 |
| 2020/0030702 | A1 * | 1/2020 | Benedetto | ............. | A63F 13/847 |
| 2023/0050195 | A1 * | 2/2023 | Pierse | ................... | A63F 13/798 |
| 2023/0078380 | A1 * | 3/2023 | Zaghetto | ................. | A63F 13/67<br>463/23 |

* cited by examiner

SYSTEM AND METHOD FOR DETERMINING A SKILL FACTOR OF A CLIENT APPLICATION

CROSS REFERENCE TO RELATED APPLICATION

This application claims the benefit of and priority to a U.S. Provisional Patent Application having U.S. Provisional Patent Application No. 63/508,332, filed on Jun. 15, 2023, and titled "SYSTEM AND METHOD FOR DETERMINING A SKILL FACTOR OF A CLIENT APPLICATION." The contents of the U.S. Provisional Patent Application having U.S. Provisional Patent Application No. 63/508,332 is incorporated by reference herein in its entirety.

BACKGROUND OF THE INVENTION

Many digital games require both skill and luck to play well. What does it mean for chance to dominate skill or vice versa? The extremes of the skill and chance spectrum are relatively easy to identify. For example, a video game that simulates throwing dice is purely a game of chance. Conversely, a video chess game is purely a game of skill. Additional examples of games of skill can include checkers, billiards, and bowling. By contrast, raffle and roulette are games of pure chance. Many digital games are comprised of a mix of skill and chance. For those cases, the term skill factor or dominant factor relates to an inquiry into the relative proportions of skill and chance. When chance is an integral part that influences the result, chance dominates the digital game. In other words, for skill to dominate, skill must control the final result and the final result must be within the player's control to a certain degree. However, such a determination is often subjective, and therefore reasonable minds may differ regarding whether a digital game outcome is dominated by skill or chance.

SUMMARY OF THE INVENTION

The present invention is directed to a system and method for determining a skill factor of a client application. According to the present invention, a determination can be made as to which client applications are skill-based and which client applications are chance-based by statistically quantifying the importance of chance in determining the outcome of the client application. In embodiments, the present invention can collect suitable results data for the client application, and then randomly divide the collected data into two data subsets of equal (or approximately equal) size. The present invention can use the first data subset to create definitions of or otherwise identify skilled and unskilled users by performing a statistical analysis of users who have interacted or otherwise engaged with the client application at least a predetermined number of times. The present invention can use the second data subset to simulate matchups between identified high-skilled users and identified low-skilled users of the client application to determine, for example, a score that indicates how often a skilled user defeats an unskilled user. The present invention can determine whether the client application is skill-based or chance-based by comparing the determined score to a predetermined score that is indicative of a skill-based client application. If the determined score is greater than or equal to the predetermined score, then the client application can be identified as skill-based.

BRIEF DESCRIPTION OF THE DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DESCRIPTION OF THE INVENTION

Figure 1:
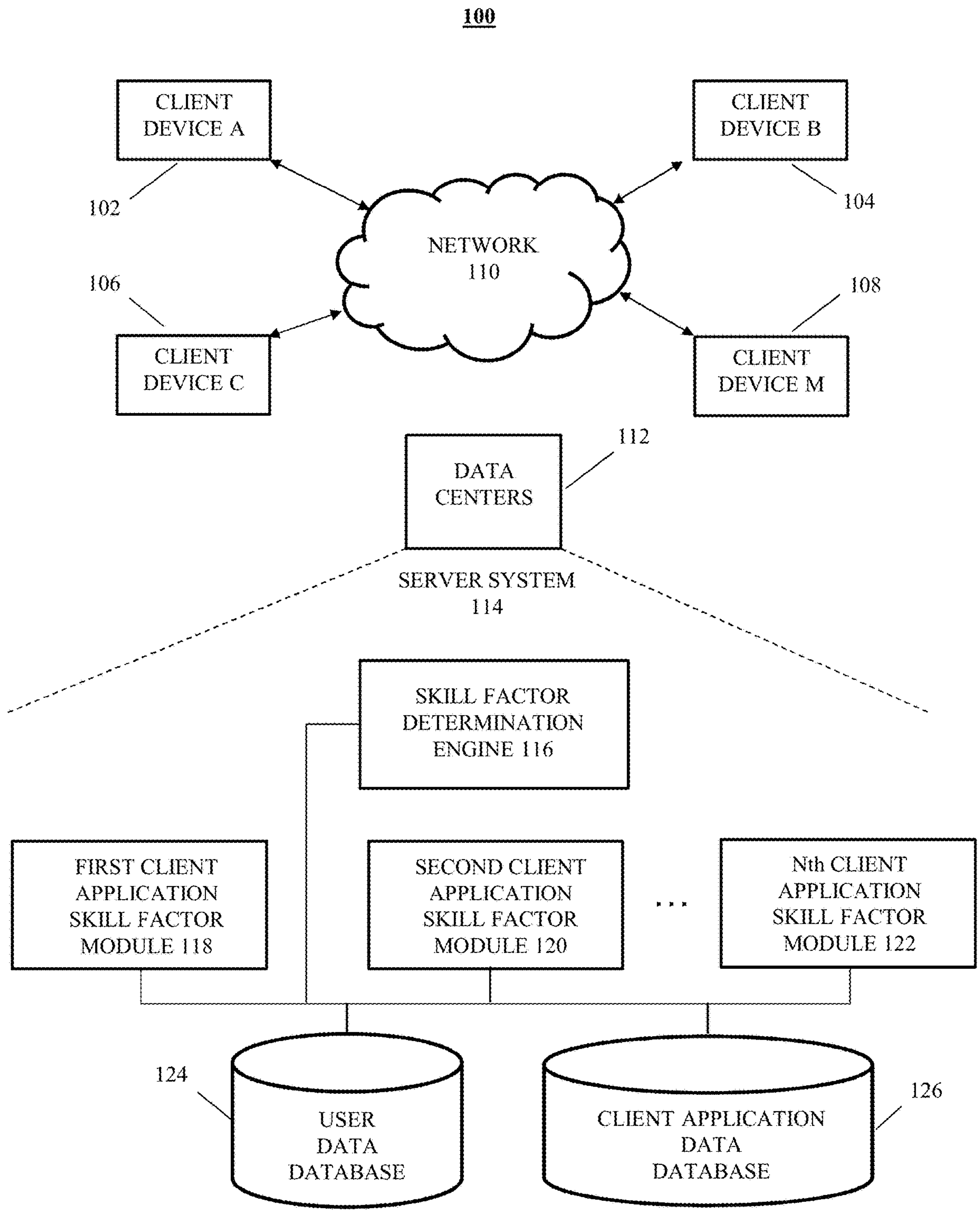
FIG. 1 block diagram illustrating an example system for determining a skill factor of a client application.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The present invention is directed to a system and method for determining a skill factor of a client application. According to the present invention, a determination can be made as to which client applications are skill-based and which client applications are chance-based by statistically quantifying the importance of chance in determining the outcome of user interactions or engagements with of the client application. In some implementations of the present invention, suitable results data can be collected for the client application, and then the collected data can be randomly divided into two data subsets of equal (or approximately equal) size. In an embodiment, the present invention can use the first data subset to create definitions of or otherwise identify skilled and unskilled users by performing a statistical analysis of users who have interacted or otherwise engaged with the client application at least a predetermined number of times. In some implementations of the present invention, the second data subset can be used to simulate matchups between identified skilled users and identified unskilled users of the client application to determine a score that indicates how often a skilled user defeats an unskilled user. In an embodiment, the present invention can identify whether the client application is skill-based or chance-based by comparing the determined score to a predetermined score that is indicative of a skill-based client application. If the determined score is greater than or equal to the predetermined score, then the client application can be identified as skill-based. Otherwise, the client application can be identified as not skill-based. Such a methodology can be used alone or in combination with one or more additional techniques to determine the skill factor of the client application.

Merely for purposes of illustration and not limitation, the present disclosure will refer to a digital game as an exemplary client application to illustrate various aspects of the present invention. However, the present invention can be used in and with any suitable type of client application in which users interact or otherwise engage with the client application and other users through skill, chance, or a combination thereof.

FIG. 1 is a block diagram illustrating an example system 100 for determining a skill factor of a client application. A server system 114 can provide functionality for collecting data associated with interactions and engagements between users and client applications (e.g., game play of players in a digital game). The server system 114 can include software components and databases that can be deployed at one or more data centers 112 in, for example, one or more geographic locations. The software components of the server system 114 can include a skill factor determination engine 116, a first client application skill factor module 118, a second client application skill factor module 120, . . . , and an Nth client application skill factor module 122, where N can be any suitable natural number. The software components can include subcomponents that can execute on the same or on different individual data processing apparatus. The databases of the server system 114 can include, for example, a user data database 124 and a client application data database 126, although other databases are possible. The databases can reside in one or more physical storage systems or be cloud-based. The software components and data will be further described below.

As illustrated in FIG. 1, the skill factor determination engine 116 can communicate with the first client application skill factor module 118, the second client application skill factor module 120, . . . , the Nth client application skill factor module 122, the user data database 124, and the client application data database 126. In some implementations of the present invention, the skill factor determination engine 116 can include one or more of the first client application skill factor module 118, the second client application skill factor module 120, . . . , and the Nth client application skill factor module 122. The user data database 124 can include, for example, any suitable information related to one or more users of client applications and the interactions between those users and the client applications, such as, for example, user interaction history (e.g., in the context of digital games, which digital games were played, number of games won in each digital game, number of games lost in each digital game, number of games played for each digital game, scores in each digital game, time played for each digital game, etc.), user identifying information (e.g., usernames), a history of user connections to the system 100, user purchases, user accomplishments, user tasks, user interactions with other users (e.g., chats), user deposits/withdrawals, user virtual item acquisition or usage, other conditions in the client application, and the like. The client application data database 126 can include, for example, information related to the client applications implemented using the system 100. The client application data database 126 can include information related to each client application, such as, for example, a virtual environment for each client application, image, video, text, and/or audio data for each client application, event data corresponding to previous, current or future events, client application state data defining a current state of each client application, and/or the like.

A software application, such as, for example, a digital game or other web-based or suitable client application, can be provided as an end-user client application to allow users to interact with the server system 114. The software application can relate to and/or provide a wide variety of functions and information, including, for example, entertainment (e.g., a game, music, videos, etc.), business (e.g., word processing, accounting, spreadsheets, etc.), news, weather, finance, sports, etc. In certain instances, the software application can provide a digital game. The digital game can be or include, for example, a sports game, an adventure game, a virtual playing card game, a virtual board game, a puzzle game, a racing game, or any other appropriate type of digital game. In an embodiment, the digital game can be an asynchronous competitive skill-based game, in which players can compete against each other in the digital game, but do not have to play the digital game at the same time. In an alternative embodiment, the digital game can be a synchronous competitive skill-based game, in which players can play the digital game at the same time and can compete against each other in the digital game in real-time. Other suitable software applications are possible.

The software application or components thereof can be accessed through a network 110 (e.g., the Internet) by users of client devices, such as client device A 102, client device B 104, client device C 106, . . . , client device M 108, where M can be any suitable natural number. Each of the client devices can be any appropriate type of electronic device that is capable of executing the software application and communicating with the server system 114 through the network 110, such as, for example, a smart phone, a tablet computer, a laptop computer, a desktop or personal computer, or the like. Other client devices are possible (e.g., portable or desktop game consoles, smart televisions, smart watches, and other like computing devices). In an alternative embodiment, the user data database 124, the client application data database 126, or any portions thereof can be stored on one or more client devices. Additionally or alternatively, software components for the system 100 (e.g., the skill factor determination engine 116, the first client application skill factor module 118, the second client application skill factor module 120, . . . , and/or the Nth client application skill factor module 122) or any portions thereof can reside on or be used to perform operations on one or more client devices.

Figure 2:
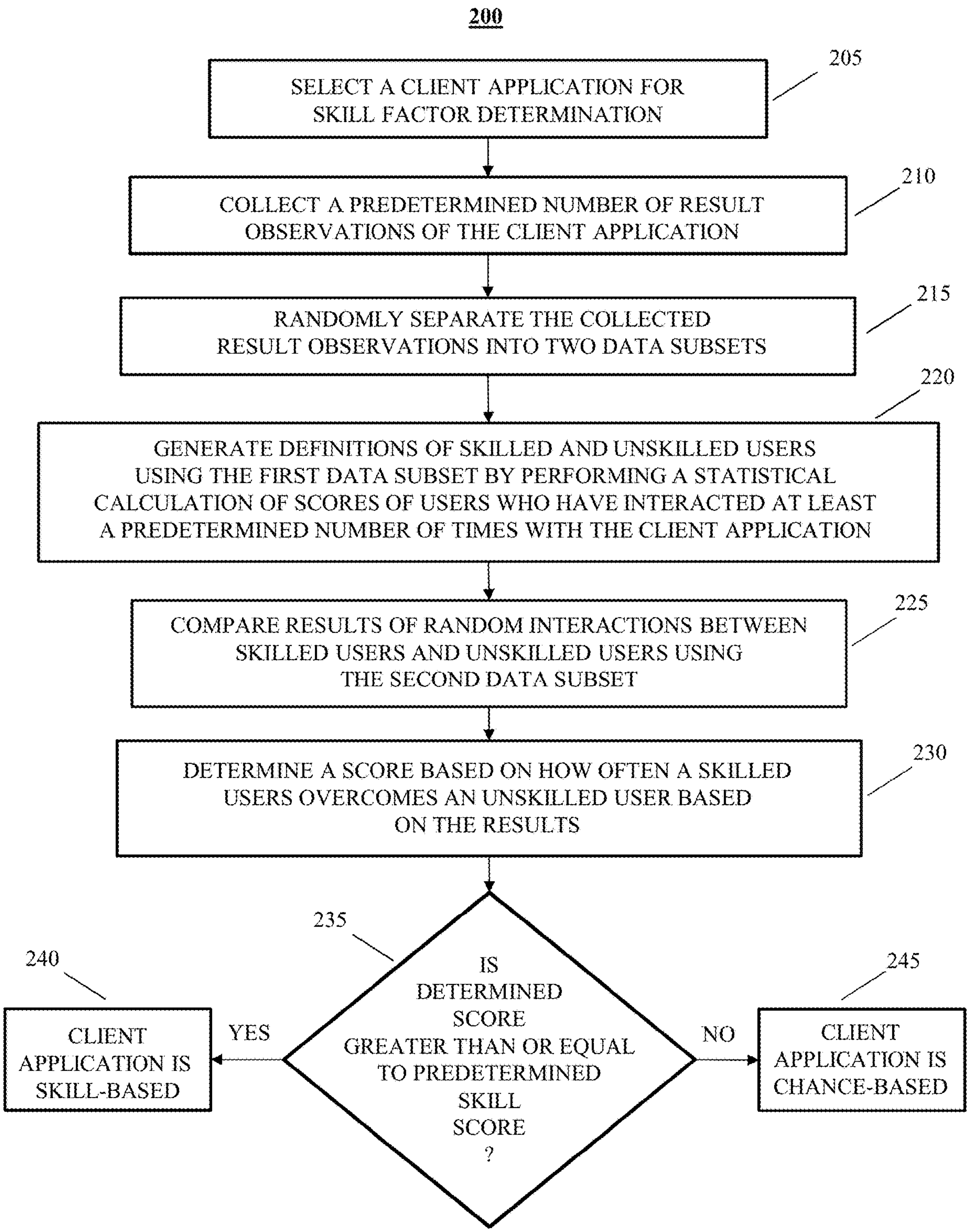
FIG. 2 is a flowchart of an example method for determining a skill factor of a client application.

Some implementations of the present invention are directed to answering the following question: "How often does a skilled user defeat an unskilled user?" According to some implementations of the present invention, matchups can be simulated between the "best" users against the "worst" users for a client application, and then analyzed for how often the best users would beat or otherwise defeat the worst users. Such information can be used to determine if a client application is skill-based or chance-based. FIG. 2 is a flowchart illustrating an example method 200 for determining a skill factor of a client application using, for example, the skill factor determination engine 116 in conjunction with the first client application skill factor module 118, in accordance with embodiments of the disclosure. In block 205, the skill factor determination engine 116 can select a client application (e.g., from a plurality of client applications) for skill factor determination (e.g., by retrieving data from the client application data database 126). In block 210, the skill factor determination engine 116 can collect a predetermined number of results observations of the client application (e.g., digital game-result observations of a digital game) to enable a comparison among users of the client application. In an embodiment, a results observation can be the outcome of an interaction or engagement between a user and a client application. For purposes of illustration and not limitation, in the context of a digital game, the results observation (i.e., a digital game-results observation) can be the outcome of a digital game, and can include such data as, for example, the wins and losses that occurred in the game, the scores of the outcomes, the time played in each game, the players associated with those wins and losses, and/or other like data. Any suitable number of results observations can be collected for the client application, such as, for example, 500, 1000, 2500, 5000, 10000, or more results observations, depending on the nature of the client application, how many results observations are available for analysis, and other like factors. However, in some implementations of the present invention, the skill factor determination performed by the skill factor determination engine 116 using the first client application skill factor module 118 generally would not commence until the predetermined number of results observations have been collected for the client application, although the skill factor determination engine 116 using the first client application skill factor module 118 can commence analysis at any suitable time with any appropriate amount of collected data. The results observations can be stored in and collected from, for example, the user data database 124.

At block 215, the skill factor determination engine 116 can use the first client application skill factor module 118 to randomly separate the collected results observations or any portion thereof into two data subsets. For example, the first client application skill factor module 118 can separate the collected results observations into a first data subset having a first size and a second data subset having a second size, although any suitable number of subsets can be created by the first client application skill factor module 118. In an embodiment, the first data subset and the second data subset can be of equal or approximately equal size, although each subset can be of any appropriate size. Merely for purposes of illustration and not limitation in the context of digital games, if a player played 100 games, the skill factor determination engine 116 can use the first client application skill factor module 118 to randomly select 50 scores to be in the first data subset and 50 scores to be in the second data subset, although the skill factor determination engine 116 can use the first client application skill factor module 118 to randomly select 25 scores to be in the first data subset and 75 scores to be in the second data subset, 75 scores to be in the first data subset and 25 scores to be in the second data subset, or any other suitable allocation of sizes between the data subsets. The first and second data subsets can be stored in and retrieved from, for example, the user data database 124. In an embodiment, the first data subset of the collected results observations (e.g., data of a first set of interaction results, which corresponds to data of a first set of game outcomes or gameplay outcomes involving one or more users interacting with the client application) can be used for classifying a user as skilled or unskilled, while the second data subset of the collected results observations (e.g., a second set of interaction results, which corresponds to additional data of a second set of game outcomes or gameplay outcomes involving one or more users interacting with the client application) can be used for analyzing the performance of those skilled (e.g., a first set of users) and unskilled users (e.g., a second set of users) when paired against each other. In other words, the first data subset can be used for training, while the second data subset can be used for testing. According to some implementations of the present invention, the creation of two distinct data sets can be used to establish mathematical independence. For example, if the same data set was used to determine which users are skilled and then used to test whether skilled users beat or otherwise defeat unskilled users, even a client application based on pure chance could appear to be largely skill-based for some data sets. In contrast, by keeping the data used to describe the users separate from the data used to test the regularity with which skilled users defeat unskilled users, bias can be minimized from one step to the next of the example method 200 illustrated in FIG. 2.

At block 220, the skill factor determination engine 116 can use the first client application skill factor module 118 to generate definitions of or otherwise identify skilled and unskilled users using the first data subset. In some implementations of the present invention, the first client application skill factor module 118 can use the first data subset to determine which users are ones who exhibit a highest skill level by performing a suitable statistical calculation of the results of users who have interacted or otherwise engaged at least a predetermined number of times with the client application, such as, in the example of digital games, the scores of players who have played at least a predetermined number of games of the digital game. In an embodiment, the statistical calculation can be a median calculation. Other suitable statistical calculations are possible and can be performed by the first client application skill factor module 118, such as average calculation, highest or maximum result or value, or any other appropriate statistical calculation. However, a median calculation can provide an optimal indicator of the consistency with which a user will be successful. For example, for asynchronous, single-player digital games in which the best players are the ones whose score is consistently higher than their opponent's score, the margin of victory can be irrelevant, and outliers, which could heavily impact a player's average score, should not carry additional weight in deriving a player's skill classification. Consequently, the use of a median calculation can have advantages over other types of statistical calculations and will be used for purposes of the present disclosure merely to illustrate various aspects of the present invention.

According to an embodiment of the present invention, any suitable number can be used for the predetermined number of user interactions or engagements, such as, for example, 10, 20, 50, 100, or the like. The appropriate value for the predetermined number of user interactions or engagements can be based on various factors. Merely for purposes of illustration and not limitation, in most skill-based digital games, skill is learned at least partially by practice. Therefore, skilled players are likely to be those who have had a minimum amount of experience, and so the appropriate value for a predetermined number of games can be based on the number of games that a player generally needs to play to become more experienced or skilled in a particular digital game. Additionally, the present invention can collect enough user data to be able to accurately determine which users are skilled and which users are unskilled. For example, if the first client application skill factor module 118 analyzed a user who had interacted or otherwise engaged, for instance, only twice, that user's median calculation would be based on a single record (e.g., since the data set can be divided in half at block 215). Such a result would likely not be a reliable means of classifying the user, as it would be tantamount to judging a golfer based on a single hole of play or a baseball player based on a single at bat. Thus, the predetermined number of user interactions or engagements can be set to an appropriate value that can provide the best balance between having a robust set of users to analyze while also ensuring that there is a sufficient amount of data to accurately classify a user.

The skill factor determination engine 116 can use the first client application skill factor module 118 to rank the results of the median calculations across all users (e.g., from highest to lowest). A predetermined top percentage of all users can be defined or otherwise identified by the first client application skill factor module 118 as “skilled.” Any appropriate percentage can be used for the predetermined top percentage, such as, for example, 5%, 10%, 15%, 20%, or the like. The first client application skill factor module 118 can determine or otherwise identify which users are the ones who exhibit “no skill” or are otherwise “unskilled” by evaluating the ranked median results of users who have interacted or otherwise engaged the predetermined number of times in and with the client application. In embodiments, the predetermined number of user interactions or engagements for the skilled and unskilled users can be the same value or can be different values. The use of a predetermined number of user interactions or engagements for the unskilled users can ensure that unskilled users are not confused with users who exhibit “no skill whatsoever” by virtue of their not understanding how to interact or engage in and with the client application. In an embodiment, a predetermined bottom percentage of all users can be defined by the first client application skill factor module 118 as “unskilled.” Any appropriate percentage can be used for the predetermined bottom percentage, such as, for example, 5%, 10%, 15%, 20%, or the like. In embodiments, the predetermined top percentage and the predetermined bottom percentage can be the same or different percentages.

Unskilled users who have interacted or engaged at least the predetermined number of times in and with the client application may result in unskilled users who are not truly “unskilled,” since they have likely acquired at least some skill via practice. This may bias the analysis of the skill-composition of the client application performed by the first client application skill factor module 118 in the direction of classifying more client applications as chance-based, since users labeled as “unskilled” are equally or substantially equally practiced to users labeled as “skilled.” Therefore, any such potential bias may make the threshold higher for classifying a client application as skill-based, which may be acceptable for a large selection of client applications. Additionally or alternatively, different percentile breakpoints can be used to define “skilled” and “unskilled” users for the predetermined top percentage and predetermined bottom percentage, respectively. Choosing a wider breakpoint to define skilled and unskilled users may bias the analysis performed by the first client application skill factor module 118 in the direction of classifying more client applications as chance-based. Therefore, any such potential bias may make the threshold higher for classifying a client application as skill-based, which may be acceptable for a large selection of client applications.

At block 225, the skill factor determination engine 116 can use the first client application skill factor module 118 to compare the results of random matchups between skilled users and unskilled users using the second data subset. To determine how often a skilled user beats or otherwise defeats an unskilled user, the first client application skill factor module 118 can use the second data subset to generate a predetermined number of random matchups between skilled users and unskilled users. Any suitable number can be used for the predetermined number of random matchups, such as, for example, 1000, 5000, 10000, 25000, or the like. Such matchups can be random pairings of one skilled user and one unskilled user. For each matchup, the first client application skill factor module 118 can select a random client application result for each user in the matchup. The client application results can come from the second data subset, which was not used to determine whether the user is skilled or unskilled. In an embodiment, the first client application skill factor module 118 can create matchups by first choosing a user and then choosing a result from that user for the client application. In the example of a digital game, the first client application skill factor module 118 can select one random skilled player and one random unskilled player, and then select one random score from the second data subset for the skilled player and one random score from the second data subset for the unskilled player. Choosing matchups in such a manner can ensure that matchups are equally likely to come from all points in the “skilled continuum” (e.g., 90th to 100th percentile) and all points in the “unskilled continuum” (e.g., 0 to 10th percentile), which can be used to avoid a bias resulting from the frequency of interactions or engagements for users at various levels of ability. To illustrate such a bias, the first client application skill factor module 118 could choose to select a random result from among all those logged by skilled users and match it to a random result from among all those logged by unskilled users. The distribution of skill level in the matchups, however, would have been proportional to the number of interactions or engagements of users at each level of skill, thereby creating an undesirable bias. In the example of a digital game, the very best players (99th percentile) might play ten or more times as many games as players in the 90th percentile, which would mean that the skilled player in each matchup would be at least ten times more likely to come from the 99th percentile than the 90th percentile.

By comparing, for example, the result, time, or other win-metric for the skilled user versus the unskilled user, the skill factor determination engine 116 can use the first client application skill factor module 118 to choose a winner of the random matchup (e.g., whichever player had the higher score). By appropriately tallying the results for the predetermined number of random matchups (e.g., total number of wins by the skilled players divided by the total number of matchups of skilled versus unskilled players), at block 230 the skill factor determination engine 116 can use the first client application skill factor module 118 to determine a score that is representative of how often a skilled user beats or otherwise defeats an unskilled user. The score can be represented as an alphanumeric value (e.g., a numerical score or a letter score), a percentage, or any suitable value that can be within any appropriate range of values. At block 235, the skill factor determination engine 116 can use the first client application skill factor module 118 to compare the determined score with a predetermined skill score to identify whether the client application is skill-based or chance-based. If the determined score is greater than or equal to the predetermined skill score, then the skill factor determination engine 116 can use the first client application skill factor module 118 to identify or otherwise classify the client application as skill-based at block 240. However, if the determined score is less than the predetermined skill score, then the skill factor determination engine 116 can use the first client application skill factor module 118 to identify or otherwise classify the client application as random or chance-based at block 245 (e.g., one or more outcomes such as game outcomes or gameplay outcomes of one or more users that utilize the client application can be random or chance-based).

The predetermined skill score can be any suitable score, such as, for example, 600, 700, 800, or the like, out of a maximum possible score (e.g., 1000, 2000, etc.). Alternatively, the predetermined skill score can be any suitable percentage, such as, for example, 60%, 70%, 80%, or the like, or any other appropriate predetermined value. Such predetermined scores will depend on various factors, including, for instance, which test(s) the first client application skill factor module 118 is attempting to satisfy. For example, the predominance test and the material element test, either alone or in combination, can be used to determine an optimal predetermined skill score for measuring whether a client application is based on skill or chance. The predominance test is the prevailing test when assessing the existence of the gambling element of chance. The element of chance is met if chance predominates over skill even if the activity requires some skill. Under such a test, there can be a continuum with pure skill on one end and pure chance on the other. On such a continuum, client applications such as chess would be on the almost pure skill end, while traditional slot machines would be on the pure chance end. Between these ends of the spectrum lie many activities containing both elements of skill and chance. The material element test provides that a particular client application will be found to be chance-based if it contains chance as a material element affecting the outcome of a user interaction or engagement in and with the client application. Such a test recognizes that although skill may primarily influence the outcome, the client application can be considered a chance-based if chance has more than a mere incidental effect on the outcome of the user interaction or engagement. Specifically, the “material degree” language has altered the mathematical exactitude of the “dominating element” test and replaced it with a subjective test that recognizes that although skill may primarily influence the outcome, the client application is chance-based if the final outcome materially depended on chance. Thus, a client application game can be considered a game of skill (or predominately skill-based) by choosing an appropriate predetermined skill score that is indicative of an immaterial level of chance in the user interactions or engagements in and with the client application, which would satisfy both the predominance test and the material element test.

In an alternative embodiment, any or all of the predetermined values discussed above can be determined dynamically. According to the alternative embodiment, the skill factor determination engine 116 and/or the first client application skill factor module 118 can use suitable machine learning/artificial intelligence techniques to dynamically choose or otherwise select the appropriate values for any or all of, for example, the number of results observations of the client application, the number of user interactions or engagements in and with the client application, the top percentage of all users, the bottom percentage of all users, the number of random matchups, the skill score, and the like. For example, one or more machine learning models can be trained based on data from either or both of the user data database 124 and client application data database 126. The one or more machine learning models can then be used to dynamically select the appropriate amounts for each or any of the aforementioned values based on, for example, characteristics of the client applications, user characteristics, such as outcome history of user interactions or engagements (e.g., in the context of digital games, wins, losses, scores, times, etc.) for the client applications, skill factor determinations for similar client applications, and other like characteristics or data. The one or more machine learning models can be updated or otherwise adapted as the characteristics, results, and other like data associated with the client applications and users evolve over time.

According to an embodiment, if the first client application skill factor module 118 determines that the client application is skill-based, then the skill factor determination engine 116 and/or the first client application skill factor module 118 (or other suitable processing logic of the server system 114) can appropriately modify one or more features or functionality of the client application, such as changing or modifying aspects of the graphical user interface of the client application, enabling/disabling features and functionality, and the like. Merely for purposes of illustration and not limitation in the context of digital games, the skill factor determination engine 116 and/or the first client application skill factor module 118 can enable paid-entry competitions in asynchronous or synchronous competitive digital games that are determined to be skill-based. Alternatively, the skill factor determination engine 116 and/or the first client application skill factor module 118 can disable paid-entry competitions in asynchronous or synchronous competitive digital games that are determined to not be skill-based. However, any suitable visual or audio elements, or other features or functionality of the client application can be modified, enabled, disabled, or otherwise updated or customized by the skill factor determination engine 116 and/or the first client application skill factor module 118 upon determination that the client application is or is not skill-based. For example, changes, modifications, or updates can be made to any or all aspects of the graphical display of the client application (e.g., one or more graphical elements of a digital game, such as any aspect of the “look and feel” of the graphical interface displayed by the digital game), the information displayed within the client application, the features and functionality of the client application, and the like. Merely for purposes of illustration and not limitation in the context of digital games, the graphical display of a digital game can be updated to display, for example, player incentives, special offers (e.g., limited time offers or LTOs), advertisements or the like to a player inside or within the digital game that is determined to be skill-based. Additionally or alternatively, different player incentives, special offers, advertisements, or the like can be displayed to a player in the digital game if it is determined to be a skill-based digital game. Additional and/or alternative prizes, rewards, and/or gifts can be displayed or presented to the player in an associated gift store for a digital game if the digital game is determined to be a skill-based. For example, a player in a skill-based digital game may be presented with prizes, rewards, gifts, or the like that are different from prizes, rewards, gifts, or the like that may be presented to another player in a digital game that has not been or not yet been determined to be a skill-based digital game. In this manner, the menu or list of prizes, rewards, and/or gifts displayed to a player in the associated gift store can be tailored to players of digital games determined to be skill-based. Additionally or alternatively, the graphical information displayed to the user outside of the client application can be updated, modified or otherwise customized, such as ads or offers surfaced to the user on their client device outside of the client application, if the client application is determined to be skill-based. Other customizations and modifications are possible for client applications determined to be skill-based.

According to embodiments of the present invention, the skill factor determination engine 116 can use the first client application skill factor module 118 to analyze the simulated matchups between skilled and unskilled users in a client application to determine whether the client application is based on skill or chance. Once the determination is made, the skill factor determination engine 116 can use the first client application skill factor module 118 to continue to analyze live user interactions or engagements (e.g., analyzing one or more real-time interactions or one or more approximately real-time interactions) in and with the client application (either in real-time, via batch or offline processing, or some combination of both) over time to update the determination. In aspects, the updating of the determination can include updating a designation of a client application from one that is based on skill to one that is based on chance, or vice versa. Merely for purposes of illustration and not limitation in the context of digital games, the skill factor determination engine 116 can use the first client application skill factor module 118 to automatically analyze the outcomes of actual, live matches in a digital game to update the determination of whether the digital game is based on skill or chance. For example, for a digital game that was previously determined to be skill-based, if the results of the analysis of live games vary from the analysis of the simulated matchups in a manner that could suggest the presence of material additional chance, then certain features or aspects of the digital game (e.g., paid-entry competitions or the like) can be restricted or eliminated or the digital game can be removed or disabled in its entirety by, for example, the skill factor determination engine 116 and/or the first client application skill factor module 118 (or other suitable processing logic of the server system 114).

Figure 3:
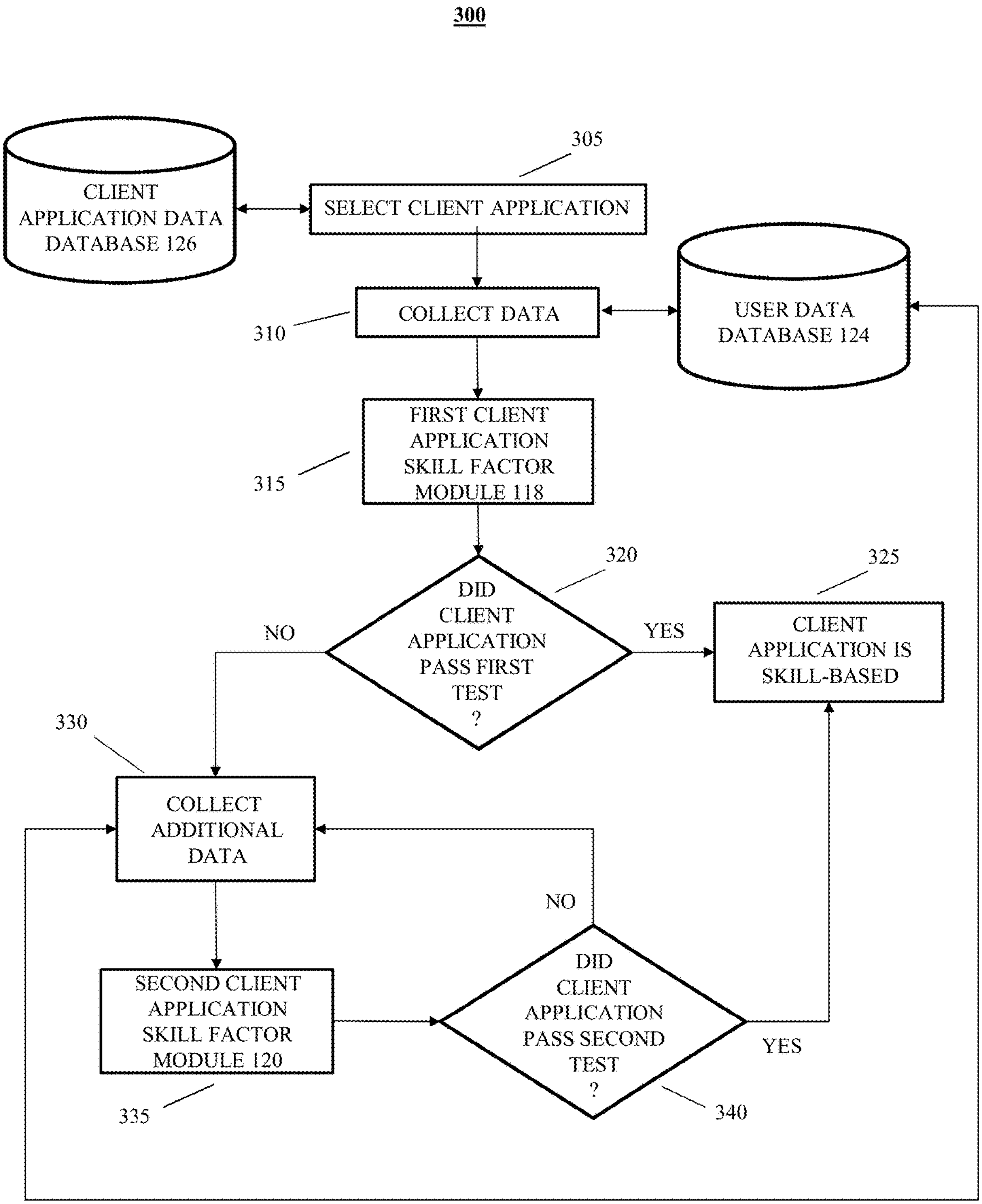
FIG. 3 is a flowchart of an example method for determining a skill factor of a client application.

Embodiments of the present invention can be used with many different types of client applications, such as, for example, digital games and the like. The method 200 can minimize false positives (i.e., indicating a digital game is skill-based when in fact it is not), because the simulations are based on comparing the observed results of the users, but those observed results may have come from very different conditions. However, in some circumstances, the present invention could yield false negatives (i.e., failing to indicate a digital game is skill-based when in fact it is). In some implementations of the present invention, to address such potential issues, the method 200 can be used in conjunction with one or more additional client application skill factor modules (e.g., the second client application skill factor module 120, . . . , Nth client application skill factor module 122) that use, include, or otherwise incorporate alternative skill determination techniques. FIG. 3 is a flowchart illustrating an example method 300 for determining a skill factor of a client application, such as, for instance, a digital game. For purposes of illustration and not limitation, the method 300 can utilize the first client application skill factor module 118 and the second client application skill factor module 120 by the skill factor determination engine 116. However, some implementations of the present invention can use any appropriate number of client application skill factor modules in any suitable order, each supporting a similar or different technique for determining a skill factor of a client application. In FIG. 3, the skill factor determination engine 116 can select (step 305) a client application to determine whether it is skill-based or chance-based. The skill factor determination engine 116 can communicate with the client application data database 126 to select and retrieve the client application and appropriate information associated with the client application. The skill factor determination engine 116 can collect data (step 310), such as a predetermined number of results observations of the client application to enable a comparison among skilled and unskilled users of the client application, as discussed above for method 200 illustrated in FIG. 2. The skill factor determination engine 116 can communicate with the user data database 124 to collect or otherwise retrieve the results observation data. The skill factor determination engine 116 can use the first client application skill factor module 118 to perform (step 315) the method 200 illustrated in FIG. 2 by randomly dividing the collected data into two data subsets, using the first data subset to identify skilled and unskilled users, and using the second data subset to compare the results of random matchups between skilled versus unskilled users to determine a score indicative of how often a skilled user defeats an unskilled user (e.g., as illustrated and discussed with respect to blocks 215-230 of FIG. 2). The skill factor determination engine 116 can use the first client application skill factor module 118 to determine (step 320) whether the client application passes the (first) method 200 (e.g., the determined score is greater than or equal to the predetermined skill score, as illustrated and discussed with respect to block 235 of FIG. 2). If the client application passes the (first) method 200, then the skill factor determination engine 116 can use the first client application skill factor module 118 to determine that the client application is skill-based (step 325). In an embodiment, client applications that are determined to be skill-based can be presented or otherwise provided to users on their respective client devices with limited to no restrictions on user interactions or engagements in and with the client application (e.g., enabled paid-entry competitions and the like in digital games).

However, if the skill factor determination engine 116 using the first client application skill factor module 118 determines (step 320) that the client application did not pass the (first) method 200 (e.g., the determined score is less than the predetermined skill score, as illustrated and discussed with respect to block 235 of FIG. 2), the skill factor determination engine 116 can collect additional data for the client application (step 330) for use by the second client application skill factor module 120. The skill factor determination engine 116 can communicate with the user data database 124 to collect or otherwise retrieve the appropriate additional data. In some implementations of the present invention, the skill factor determination engine 116 can communicate with the client application data database 126 to additionally or alternatively collect or otherwise retrieve the appropriate additional data. The type(s) and amount(s) of additional data collected by the skill factor determination engine 116 will depend on the technique or methodology used by the second client application skill factor module 120. The skill factor determination engine 116 can use the second client application skill factor module 120 to analyze (step 335) the collected additional data from the client application to determine whether the client application is based on skill or chance.

In some implementations of the present invention, the second client application skill factor module 120 can use any suitable additional or alternative technique or methodology for determining a game skill factor of the client application. For example, the second client application skill factor module 120 can use the methodology disclosed in U.S. Pat. No. 8,882,576, titled "Determining Game Skill Factor" (the '576 patent), the entire contents of which are incorporated by reference herein. The methodology disclosed in the '576 patent is based on score variances, and can compare a user-level score variance to a game-level score variance. If the user-level score variance accounts for most of the game-level score variance, then the digital game is skill-based. Additionally or alternatively, a variation of the method 200 of FIG. 2 can be used. For example, instead of separating the data into two subsets or portions, a training portion and a testing portion (e.g., as illustrated and discussed with respect to block 215 of FIG. 2), the data can be kept as a single dataset. The single dataset can be used to compare the scores of an appropriate top percentage of users (e.g., by median score) to those of an appropriate bottom percentage of users (e.g., by median score). If the top percentage of users most frequently beat or otherwise defeat the bottom percentage of users, then the client application can be identified or otherwise classified as skill-based. Additionally or alternatively, as another variation of the method 200 of FIG. 2, instead of separating the data into two subsets or portions initially, the first data subset can be generated by randomly separating out a first portion from the collected results observations. The first data subset can be used to create the definitions of skilled and unskilled users (e.g., as illustrated and discussed with respect to block 220 of FIG. 2). Once the definitions are created, the data from the first data subset can be returned to the pool of collected results observations. The second data subset can then be generated by randomly separating out a second portion from the pool of collected results observations. The second data subset can be used to compare the results of random match-ups between skilled and unskilled users (e.g., as illustrated and discussed with respect to block 225 of FIG. 2). Additionally or alternatively, as another variation of the method 200 of FIG. 2, instead of collecting the predetermined number of results observations of the client application and then randomly separating the data into two data subsets (e.g., as illustrated and discussed with respect to blocks 210 and 215 of FIG. 2), a first predetermined number of results observations can be randomly collected for the first data subset, and a second predetermined number of results observations can be randomly collected for the second data subset. The first and second predetermined number of results observations can each be any suitable predetermined number and can be the same or different predetermined numbers.

Additionally or alternatively, an Exceptional Player Frequency Likelihoods (EPFL) methodology can be used for the second client application skill factor module 120 (or other client application skill factor modules). The EPFL methodology can assess whether a client application is predominantly skill-based by determining if the observed user outcomes in the client application are better explained by a high-skill client application or a pure-luck client application. The methodology can be based upon the win rates of individual users. For each user, the EPFL methodology can first calculate both the likelihood of observing that user's win rate under the assumption of a client application of high skill and the likelihood of observing that user's win rate under the assumption of a client application of pure luck. The EPFL methodology can combine the likelihoods (assuming a high-skill client application) across all users, and can combine the likelihoods (assuming a pure-luck client application) across all users. If the combined likelihood assuming a high-skilled client application is greater than the combined likelihood assuming a client application of pure luck, then the client application being assessed can be deemed to be predominantly skill-based.

The EPFL methodology can use two different thresholds: pmax and odds ratio. The pmax threshold can determine what qualifies as an exceptional user. The pmax threshold can determine how large of a sample is to be collected. For example, the larger the pmax, the more rare the occurrence of an exceptional user and thus the more users that should be evaluated to identify an exceptional user, which can result in a larger data sample. The odds ratio threshold can determine whether or not the element of chance is deemed as immaterial to the client application, so that a client application with sufficiently large odds can be considered to have immaterial chance. In some implementations of the present invention, the pmax and odds ratio minimum thresholds can be determined by, for example, the second client application skill factor module 120 running simulations of a pure chance client application. Any thresholds that are determined should not, with reasonable confidence, pass a pure-chance client application. To determine the pmax and odds ratio minimum thresholds for the EPFL methodology, the second client application skill factor module 120 can set the number of users and the number of interactions or engagements per user for pure chance client application matches that are to be simulated. For each user and each client application, the second client application skill factor module 120 can randomly determine whether the user has won or lost. The second client application skill factor module 120 can apply an exceptional player algorithm using a suitable range of pmax values and record the odds ratios. The second client application skill factor module 120 can repeat the random determination and recordation steps a predetermined number of times (e.g., 500, 1000, 5000, 10000, or the like). After repeating the two steps for the predetermined number of times, the second client application skill factor module 120 can calculate an upper bound of a predetermined confidence interval (e.g., 75%, 85%, 95%, or the like) from the simulations. Based on the results, the second client application skill factor module 120 can determine the minimum thresholds for pmax and the odds ratio. Other techniques and methodologies for use by the second client application skill factor module 120 (or other client application skill factor modules) are possible.

As illustrated in FIG. 3, the skill factor determination engine 116 can use the second client application skill factor module 120 to determine (step 340) whether the client application passes the second technique or methodology implemented for the second client application skill factor module 120. If the client application passes the second technique, then the skill factor determination engine 116 can use the second client application skill factor module 120 to determine that the client application is skill-based (step 325). However, if the skill factor determination engine 116 uses the second client application skill factor module 120 to determine (step 340) that the digital game did not pass the second technique or methodology implemented for the second client application skill factor module 120, additional data for the client application can be collected (step 330) by the skill factor determination engine 116 for use by the second client application skill factor module 120. In an embodiment, additional data can be collected (step 330) and the client application analyzed and tested (steps 335 and 340) until the client application passes the second technique or methodology implemented for the second client application skill factor module 120. Alternatively, the second client application skill factor module 120 can execute the second technique or methodology implemented for the second client application skill factor module 120 a predetermined number of times (or until a certain period of time has elapsed) or until the client applications passes the second technique or methodology, whichever comes first. Consequently, the client application can be considered skill-based if it passes either or both of the first and second techniques implemented by the first client application skill factor module 118 and second client application skill factor module 120, respectively. Otherwise, if the client application fails both techniques or methodologies, the client application can be identified or otherwise classified as chance-based and not skill-based. If the client application is determined to be chance-based, then certain aspects of the client application can be restricted or eliminated (e.g., disabling paid-entry competitions or the like in the context of digital games) or the client application can be disabled or removed in its entirety.

According to an alternative embodiment of the present invention, a plurality of additional client application skill factor modules can be used to determine whether a client application is based on skill if the client application did not pass the first skill factor determination technique implemented by the first client application skill factor module 118 (step 320) or the second skill factor determination technique implemented by the second client application skill factor module 120 (step 340). Any suitable number of additional client application skill factor modules can be used. For example, each of the plurality of additional client application skill factor modules can implement one of the additional or alternative techniques or methodologies discussed previously or even the method 200 of FIG. 2. If the client application does not pass the second method technique or methodology implemented for a first one of the plurality of additional client application skill factor modules, then the client application can be analyzed and tested by another one of the plurality of additional client application skill factor modules (after suitable data collection by, for example, the skill factor determination engine 116). Such a process can continue through the remaining ones of the plurality of additional client application skill factor modules until the client application passes a technique or methodology implemented for one of the additional client application skill factor modules, until a predetermined number of attempts have been made, until a certain predetermined time period has elapsed, or the like. In an embodiment, if the client application does not pass any of the techniques, then additional data can be collected for the client application, which can be passed through the array of additional client application skill factor modules again until the client application passes any or any combination of the techniques or methodologies, until a predetermined number of attempts have been made, until a certain predetermined time period has elapsed, or the like. Otherwise, the client application can be identified or otherwise classified as based on chance and not skill-based. If the client application is determined to be chance-based, then certain aspects of the client application can be restricted or eliminated (e.g., disabling paid-entry competitions or the like in the context of digital games) or the client application can be disabled or removed in its entirety.

In some implementations of the present invention, the second client application skill factor module 120 can dynamically choose a particular technique or methodology by which to analyze and test the client application based on, for example, the type of client application being analyzed (e.g., in the context of digital games, synchronous versus asynchronous, board-based versus non-board-based, etc.). For purposes of illustration and not limitation, a board-based determination can determine whether a digital game is considered board-based or not by (i) calculating player-level score variance and then averaging the variance across players, (ii) calculating the game-level score variance, and (iii) calculating the ratio of (i)/(ii). If the ratio is greater than or equal to a predetermined board game ratio (e.g., a ratio closer to 1), then the digital game can be considered board-based. In contrast, if the ratio is small (e.g., a ratio closer to 0), then the digital game would not be considered board-based. The second client application skill factor module 120 (or any or all of the plurality of additional client application skill factor modules) can use suitable machine learning/artificial intelligence techniques to dynamically choose or otherwise select the appropriate technique or methodology to be used for a client application. For example, a machine learning model can be trained based on data from either or both of the user data database 124 and client application data database 126. The machine learning model can then be used to dynamically select the appropriate technique or methodology for testing the client application based on characteristics of the client application, user interaction or engagement outcome history (e.g., in the context of digital games, wins, losses, scores, times, etc.) for the client application, and other like characteristics or data. The machine learning model can be updated or otherwise adapted as the characteristics, results, and the like associated with the client application evolve over time.

In some implementations of the present invention, either or both of the first client application skill factor module 118 and the second client application skill factor module 120 (and any additional client application skill factor modules) can continue to analyze the client application over time to update the determination. In the example of digital games, either or both of the first client application skill factor module 118 and the second client application skill factor module 120 can automatically analyze the outcomes of actual, live matches in a digital game to update the determination of whether the digital game is based on skill or chance. In an alternative embodiment, the present invention can use a combination of real-time and batch (offline) processing to update such a determination. For example, the first client application skill factor module 118 can be used for batch processing to make a first determination using the data stored in and retrieved from the user data database 124. After the first determination is made, the second client application skill factor module 120 (or each or any of the plurality of additional client application skill factor modules) can be used for real-time processing when the client application is released (i.e., "live") to provide an updated analysis in real-time as users interact or engage in and with the client application. Other configurations of the first client application skill factor module 118 and the second client application skill factor module 120 (and each or any of the plurality of additional client application skill factor modules) to determine the skill factor of a client application are possible.

Figure 4:
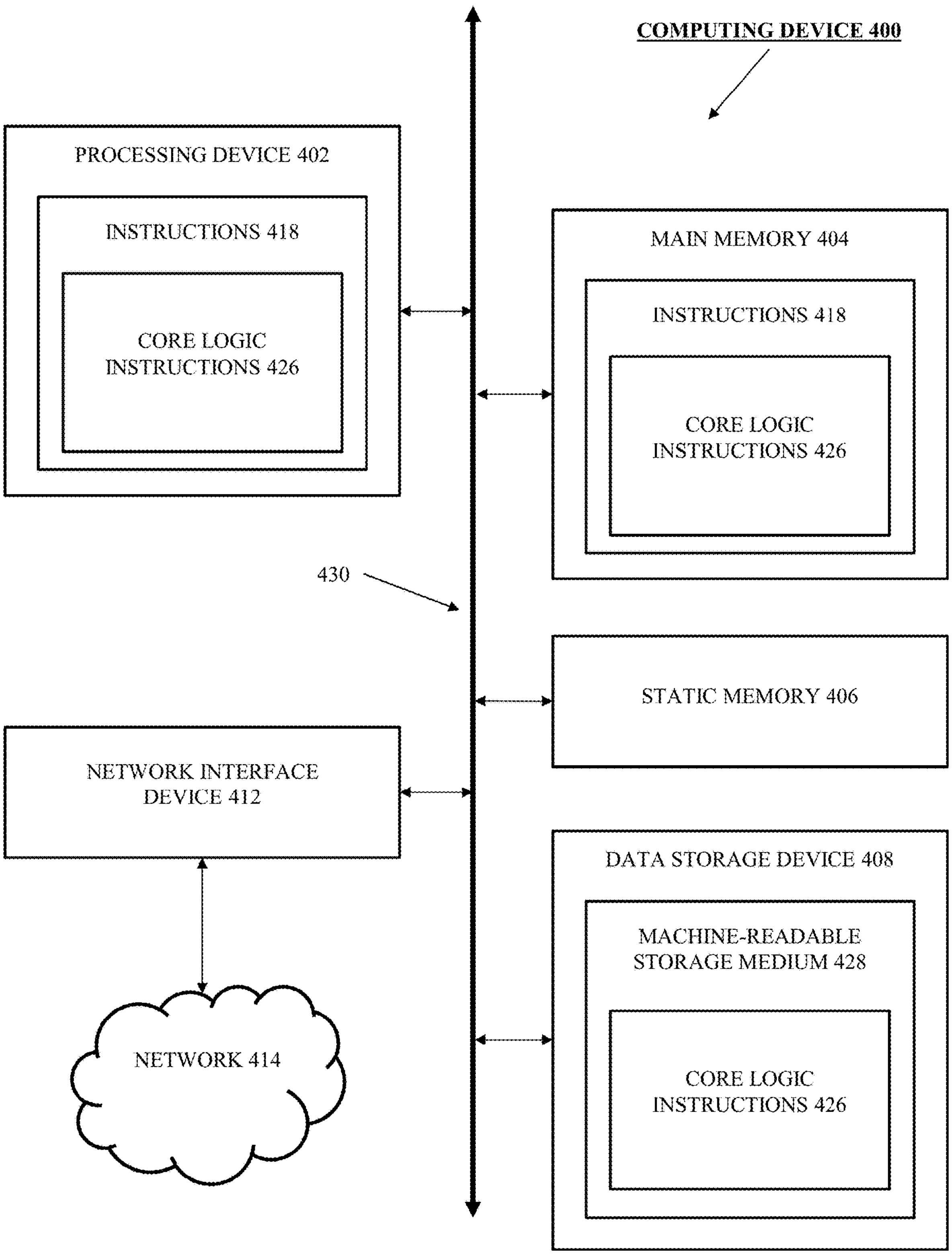
FIG. 4 is a block diagram of an example computing device that may perform one or more of the operations described herein, in accordance with the present embodiments.

FIG. 4 is a block diagram of an example computing device 400 that may perform one or more of the operations described herein, in accordance with the present embodiments. The computing device 400 may be connected to other computing devices in a LAN, an intranet, an extranet, and/or the Internet. The computing device 400 may operate in the capacity of a server machine in client-server network environment or in the capacity of a client in a peer-to-peer network environment. The computing device 400 may be provided by a personal computer (PC), a set-top box (STB), a server, a network router, switch or bridge, or any machine capable of executing a set of instructions (sequential or otherwise) that specify actions to be taken by that machine. Further, while only a single computing device 400 is illustrated, the term "computing device" shall also be taken to include any collection of computing devices that individually or jointly execute a set (or multiple sets) of instructions to perform the methods discussed herein.

The example computing device 400 may include a computer processing device 402 (e.g., a general purpose processor, ASIC, etc.), a main memory 404, a static memory 406 (e.g., flash memory or the like), and a data storage device 408, which may communicate with each other via a bus 430. The computer processing device 402 may be provided by one or more general-purpose processing devices such as a microprocessor, central processing unit, or the like. In an illustrative example, computer processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The computer processing device 402 may also comprise one or more special-purpose processing devices, such as an application specific integrated circuit (ASIC), a field programmable gate array (FPGA), a digital signal processor (DSP), network processor, or the like. The computer processing device 402 may be configured to execute the operations described herein, in accordance with one or more aspects of the present disclosure, for performing the operations and steps discussed herein.

The computing device 400 may further include a network interface device 412, which may communicate with a network 414. The data storage device 408 may include a machine-readable storage medium 428 (e.g., non-transitory computer-readable media storing instructions for execution) on which may be stored one or more sets of instructions, e.g., instructions for carrying out the operations described herein, in accordance with one or more aspects of the present disclosure. Instructions 418 implementing core logic instructions 426 may also reside, completely or at least partially, within main memory 404 and/or within computer processing device 402 during execution thereof by the computing device 400, main memory 404 and computer processing device 402 also constituting computer-readable media. The instructions may further be transmitted or received over the network 414 via the network interface device 412.

While machine-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, magnetic media, and the like.

The subject matter described herein provides many technical advantages. For example, the server system 114 can scale to support concurrent skill factor determination for large numbers of client applications, such as hundreds, thousands, or more client applications, thereby substantially improving computer resource allocation. Thus, some implementations of the present invention can improve the efficiency and processing capabilities of computer hardware resources (e.g., computer processing and memory) to determine the skill factor of client applications and provide substantially faster skill factor determination times, particularly for large numbers of client applications. By improving the skill factor determination speed and efficiency for large numbers of client applications, computer hardware resources can be freed up more quickly and used for other tasks and processes, resulting in a significant improvement in computer resource utilization.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The one or more programmable processors can be part of at least one computing system. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, solid state drives, or the like. However, a computer need not have such devices. Moreover, a computer can be embedded in another device, e.g., a smart phone, a mobile audio or media user, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor, a light emitting diode (LED) monitor, or the like, for displaying information to the user and a keyboard and a pointing device, e.g., a mouse, a trackball, a touchpad, a stylus, or the like, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like. In addition, a computer can interact with a user by sending resources to and receiving resources from a device that is used by the user; for example, by sending web pages to a web browser on a user's client device in response to requests received from the web browser.

Embodiments of the subject matter described in this disclosure can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), peer-to-peer networks (e.g., ad hoc peer-to-peer networks), and the like.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Reference throughout this disclosure to "one embodiment" or "an embodiment" means that a particular feature, structure, or characteristic described in connection with the embodiments included in at least one embodiment. Thus, the appearances of the phrase "in one embodiment" or "in an embodiment" in various places throughout this disclosure are not necessarily all referring to the same embodiment. In addition, the term "or" is intended to mean an inclusive "or" rather than an exclusive "or."

While this disclosure contains many specific implementation details, these should not be construed as limitations on the scope of any inventions or of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations and/or logic flows are depicted in the drawings and/or described herein in a particular order, this should not be understood as requiring that such operations and/or logic flows be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The above description of illustrated implementations of the invention is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

What is claimed is:

1. A method, comprising:

accessing, by at least one data processor data from a plurality of client applications wherein each client application is associated with a respective user from a plurality of users, and wherein the accessed data characterizes historical gaming metrics of the respective users and includes a first set of interaction results and a second set of interaction results;

performing, by the at least one data processor and using the first set of interaction results, a statistical analysis of the plurality of users based on the historical gaming metrics to generate a first set of users and a second set of users, the first set of interaction results representing data of a first set of game outcomes associated with the plurality of users that interacted with the plurality of client applications;

determining, by the at least one data processor and using the second set of interaction results, outcomes of a number of random matchups between one or more users selected from the first set of users and one or more additional users selected from the second set of users to generate a score indicating a likelihood of one or more users selected from the first set of users defeating one or more users selected from the second set of users, the second set of interaction results representing additional data of a second set of game outcomes associated with the plurality of users that interacted with the plurality of client applications;

modifying each of the plurality client applications when the score that is generated is greater than or equal to a skill score, wherein the modification includes updating a graphical user interface on each client application to display a targeted advertisement prompting entry into an online skills-based gaming competition, and wherein the modification is performed by a skill factor module integrated into each client application and executed on a respective client device, each skill factor module in communication with the at least one data processor to provide the online skills-based gaming competition; and providing, by the at least one data processor, the plurality of client applications that are modified to the plurality of users on the respective client devices.

2. The method of claim 1, further comprising selecting, by the at least one data processor, a client application from the plurality of client applications.

3. The method of claim 1, further comprising extracting, by the at least one data processor, the first set of interaction results representing the data of the first set of game outcomes associated with the plurality of users of the plurality of client applications, the first set of interaction results usable for classifying a skill level of each of the plurality of users.

4. The method of claim 3, further comprising extracting, by the at least one data processor, the second set of interaction results representing the additional data of the second set of game outcomes associated with the plurality of users of the plurality of client applications, the second set of interaction results usable for analyzing a performance of at least a user from the first set of users relative to at least a user from the second set of users.

5. The method of claim 1, wherein the plurality of client applications executes on respective client devices of users.

6. The method of claim 1, further comprising determining, by the at least one data processor, that one or more outcomes associated with the plurality of client applications is random, when the score that is generated is less than the skill score.

7. The method of claim 1, further comprising analyzing one or more real-time interactions of one or more of the plurality of users with the plurality of client applications.

8. The method of claim 7, further comprising updating a designation of the client application based on the analyzing of the one or more real-time interactions of the one or more of the plurality of users with the plurality of client applications.

9. A system, comprising:

at least one data processor; and memory storing instructions that, when executed by the at least one data processor, cause the at least one data processor to perform operations comprising:

accessing, by the at least one data processor, data from a plurality of client applications, wherein each client application is associated with a respective user from a plurality of users, and wherein the accessed data characterizes historical gaming metrics of the respective users and includes a first set of interaction results and a second set of interaction results;

performing, by the at least one data processor and using a first set of interaction results, a statistical analysis of the plurality of users based on the historical gaming metrics to generate a first set of users and a second set of users, the first set of interaction results representing data of a first set of game outcomes associated with the plurality of users that interacted with the plurality of client applications;

determining, by the at least one data processor and using the second set of interaction results, outcomes of a number of random matchups between one or more users selected from the first set of users and one or more users selected from the second set of users to generate a score indicating a likelihood of one or more users selected from the first set of users defeating one or more users selected from the second set of users, the second set of interaction results representing additional data of a second set of game outcomes associated with the plurality of users that interacted with the plurality of client applications;

modifying, each of the client applications when the score that is generated is greater than or equal to a skill score, wherein the modification includes updating a graphical user interface on each client application to display a targeted advertisement prompting entry into an online skills-based gaming competition, and wherein the modification is performed by a skill factor module integrated into each client application and executed on a respective client device, each skill factor module in communication with the at least one data processor to provide the online skills-based gaming competition; and providing, by the at least one data processor, the plurality of client applications that are modified to the users on the respective client devices.

10. The system of claim 9, wherein the operations further comprise selecting, by the at least one data processor, a client application from the plurality of client applications.

11. The system of claim 9, wherein the operations further comprise extracting, by the at least one data processor, the first set of interaction results representing the data of the first set of game outcomes associated with the plurality of users of the plurality of client applications, the first set of interaction results usable for classifying a skill level of each of the plurality of users.

12. The system of claim 11, wherein the operations further comprise extracting, by the at least one data processor, the second set of interaction results representing the data of the first set of game outcomes associated with the plurality of users of the plurality of client applications, the second set of interaction results usable for analyzing a performance of at least a user from the first set of users relative to at least a user from the second set of users.

13. The system of claim 9, wherein the plurality of client applications executes on respective client devices of users.

14. The system of claim 9, wherein the operations further comprise determining, by the at least one data processor, that one or more outcomes associated with the plurality of client applications is random, when the score that is generated is less than the skill score.

15. The system of claim 9, wherein the operations further comprise analyzing, after determining that the client application is skill-based, one or more real-time interactions of one or more of the plurality of users with the plurality of client applications.

16. The system of claim 15, wherein the operations further comprise updating a designation of the client application based on the analyzing of the one or more real-time interactions of the one or more of the plurality of users with the plurality of client applications.

17. A non-transitory computer-readable media storing instructions that, when executed by at least one programmable processor, cause the at least one programmable processor to perform operations comprising:

accessing, by at least one data processor, data from a plurality of client applications, wherein each client application is associated with a respective user from a plurality of users, and wherein the accessed data characterizes historical gaming metrics of the respective users and includes a first set of interaction results and a second set of interaction results;

performing, by the at least one programmable processor and using a first set of interaction results, a statistical analysis of the plurality of users based on the historical gaming metrics to generate a first set of users and a second set of users, the first set of interaction results representing data of a first set of game outcomes associated with the plurality of users that interacted with the plurality of client applications;

determining, by the at least one data processor and using the second set of interaction results, outcomes of a number of random matchups between one or more users selected from the first set of users and one or more users selected from the second set of users to generate a score indicating a likelihood of one or more users selected from the first set of users defeating one or more users selected from the second set of users, the second set of interaction results representing additional data of a second set of game outcomes associated with the plurality of users that interacted with the plurality of client applications;

modifying each of the client applications when the score that is generated is greater than or equal to a skill score, wherein the modification includes updating a graphical user interface on each client application to display a targeted advertisement prompting entry into an online skills-based gaming competition, and wherein the modification is performed by a skill factor module integrated into each client application and executed on a respective client device, each skill factor module in communication with the at least one data processor to provide the online skills-based gaming competition; and providing, by the at least one data processor, the plurality of client applications that are modified to the users on the respective client devices.

18. The non-transitory computer-readable media of claim 17, wherein the operations further comprise selecting, by the at least one data processor, a client application from the plurality of client applications.

19. The non-transitory computer-readable media of claim 17, wherein the operations further comprise, analyzing one or more real-time interactions of one or more users of the plurality of users associated with the plurality of client applications.

20. The non-transitory computer-readable media of claim 19, wherein the operations further comprise updating a designation of the client application based on the analyzing of the one or more real-time interactions of one or more users of the plurality of users associated with the plurality of client applications.

* * * * *